No. 809,079. PATENTED JAN. 2, 1906.
C. VIVES-NAVARRO.
THILL COUPLING.
APPLICATION FILED JAN. 19, 1905.
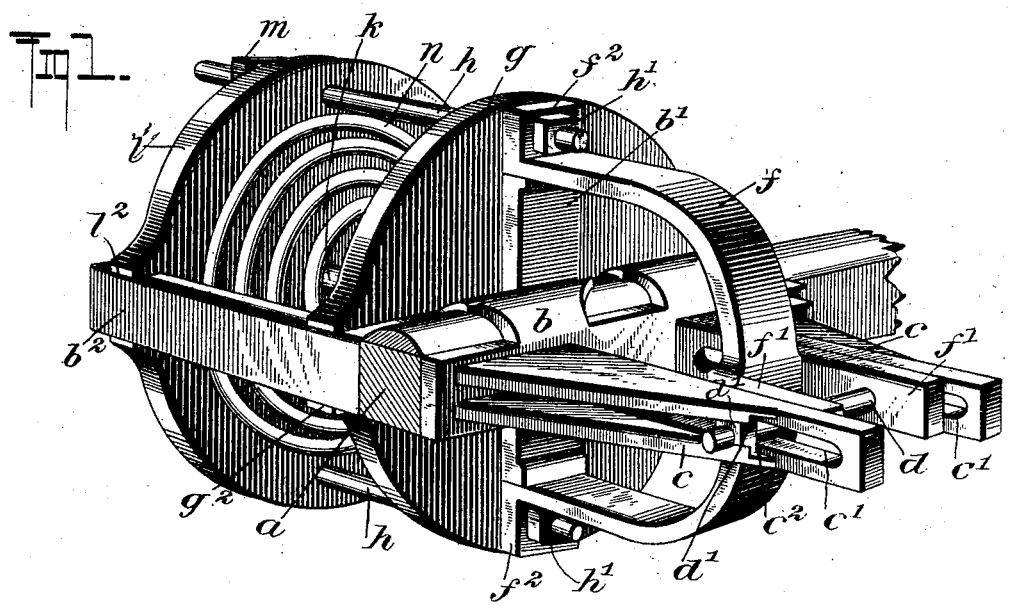
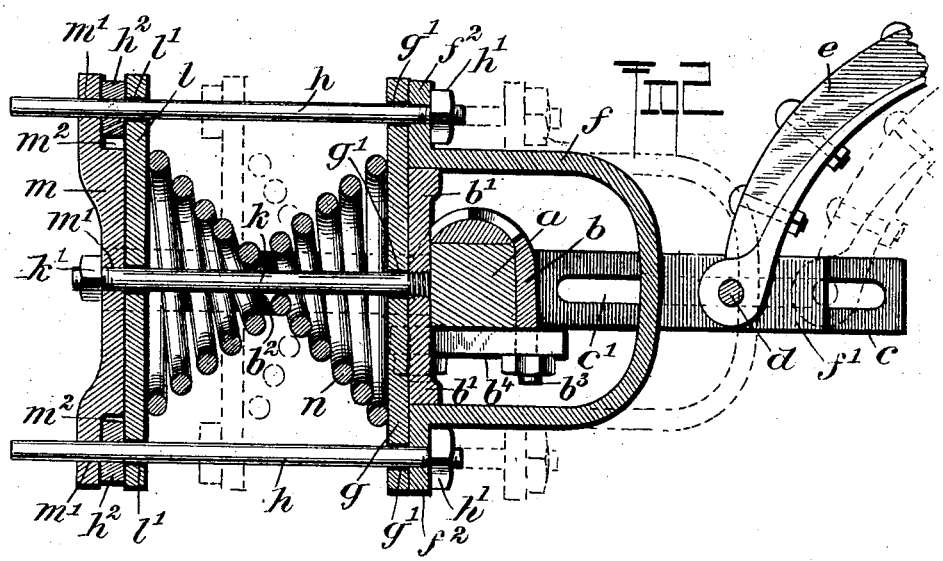
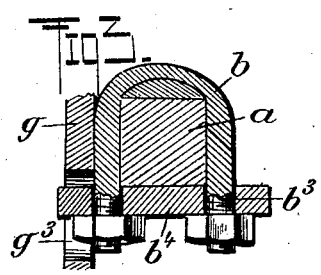
WITNESSES:
INVENTOR
Carlos Vives-Navarro
BY
ATTORNEYS

UNITED STATES PATENT OFFICE.

CARLOS VIVES-NAVARRO, OF PONCE, PORTO RICO.

THILL-COUPLING.

No. 809,079.　　　Specification of Letters Patent.　　　Patented Jan. 2, 1906.

Application filed January 19, 1905. Serial No. 241,771.

*To all whom it may concern:*

Be it known that I, CARLOS VIVES-NAVARRO, a citizen of Porto Rico, and a resident of Ponce, Porto Rico, have invented a new and Improved Thill-Coupling, of which the following is a full, clear, and exact description.

My invention relates to a coupling for connecting the thills or tongue of a vehicle with the axle or any part of the frame thereof.

The principal objects of the invention are to provide means whereby the exertion of the pull upon the thills or tongue will be yieldingly resisted, so that the sudden starting up of the draft-animal will not cause a sudden jolt of the vehicle and so as to relieve the animal and vehicle from sudden strains of all kinds, also to provide similar means for causing the same kind of a resistance when the animal backs or the vehicle is pushed toward it.

Further objects of the invention will appear in the course of the subjoined description.

Reference is to be had to the accompanying drawings, forming a part of this specification, in which similar characters of reference indicate corresponding parts in all the figures.

Figure 1 is a perspective view of one embodiment of my invention. Fig. 2 is a vertical longitudinal sectional view thereof through the center, and Fig. 3 is a fragmentary sectional view of certain details.

The axle of the vehicle is represented by the letter $a$; but it will be understood that any other portion of the frame may take the place of the axle for the purpose of attaching the device to the vehicle. Upon this part of the frame or axle is applied a frame $b$. This frame is provided with a pair of forwardly-projecting brackets $c$. Each of these brackets is provided with a longitudinal slot $c'$ and with a guide $c^2$. Through the slots passes a pin $d$, by means of which the thills $e$ or the tongue of the vehicle may be pivotally attached. The pin is provided with a square nut $d'$ or other convenient device upon each end, these nuts being adapted to move in the guides $c^2$ and to be accurately guided thereby, so that the pin will move forward and backward in a straight line only. Connected with the pin is a yoke $f$, this yoke being provided with a pair of projections $f'$, through which the pin passes and by which the yoke is connected with the pin. The yoke preferably projects both upwardly and downwardly from the first-mentioned projections and terminates in a pair of feet $f^2$, one above and one below the frame $b$. These feet are preferably mounted at the ends of a pair of projections $b'$ upon the frame $b$, which, as shown, consists of two parts.

Back of the projections $b'$ is a disk $g$, which is free to move with respect to the frame $b$. This disk is provided with perforations $g'$, through which pass rods $h$ and $k$, the rods $h$ being provided with nuts $h'$, which are secured to the front side of the feet $f^2$, through which these rods pass. The rod $k$ is secured in the frame $b$ in any desired manner. This disk is also provided with a notch $g^2$ on each side, fitting a plate $b^2$, which is mounted on each side of the frame $b$, the two plates $b^2$ constituting guides for the disk $g$ in an obvious manner and constraining the disk to move longitudinally in a direction parallel to the movement of the pin $d$. A second disk $l$ is mounted at the opposite end of the rod $k$. This disk is preferably formed in a similar shape to the disk $g$ and has perforations $l'$ and notches $l^2$ similar to the perforations $g'$ and notches $g^2$ and operating in a similar manner. This disk is also free to slide upon the rods $h$ and $k$ and the guide-plates $b^2$. At the rear of the disk $l$ is a plate $m$, which is provided with perforations $m'$ for the reception of the rods $h$ and $k$. The rods $h$ are free to slide through their respective perforations; but the rod $k$ is secured to the plate $m$ by the use of a nut $k'$ or in any other desired manner. It will thus be seen that the plate $m$ is substantially fixed in a stationary position with respect to the frame $b$, for it is prevented from moving backwardly therefrom by the nut $k'$, while it is normally prevented from moving toward the frame $b$ by means to be described, although it is not essential that it should be rigidly fixed, and if it moves toward the frame $b$ no harm will be done. This plate can conveniently be absolutely fixed upon the guide-plates $b^2$, if desired, and this construction comes within the scope of my invention. The frame $b$ has screw-threaded projections $b^3$, by means of which plates $b^4$ are secured to it for holding the yoke or axle $a$. The plate $g$ is preferably cut at $g^3$ to accommodate the plates $b^4$.

The plate $m$ is provided with notches $m^2$, which receive nuts $h^2$, fixedly mounted upon the rods $h$. These nuts, it will be observed, prevent the movement of the rods $h$ rearwardly from the position shown in Fig. 2, while they permit the rods to move forwardly, provided the disk $l$ moves with them. Situated between the two disks and preferably surrounding the rod $h$ is a biconical spring $n$, normally forcing the disks $g$ and $l$ away from each other.

The operation of the device will be readily understood. Supposing the parts to be in their normal position, as shown in full lines in Fig. 2, any force exerted upon the thills or tongue will pull the pin $d$ foward in the slots $c'$ and the nuts $d'$ forward in the guides $c^2$. This movement will be rectilinear on account of the guiding means provided. It will also force the yoke $f$ forward in the same manner and on account of the nuts $h'$ and $h^2$ pull the rods $h$ and disk $l$ forward, so that the parts will assume a position similar to that indicated in dotted lines in Fig. 2. This motion will be resisted by the spring $n$, and a sudden pull will be prevented from giving a sudden jerk to the vehicle. If the horse backs suddenly or if the vehicle reaches a slope and tends to move rapidly toward the horse, this operation will be checked in a similar manner, for the rods $h$ will be checked in the position shown in full lines in Fig. 2 by the nuts $h^2$, while the backward motion of the yoke $f$ will be permitted to extend to the rear beyond the position shown in full lines, carrying the disk $g$ backwardly, this motion being checked by the spring $n$ in an obvious manner. Thus the two motions that the horse can impart to the vehicle are checked gradually and not suddenly, while the animal is relieved from sudden pulls.

The advantages of the invention, whether carried out in the form shown or in any other form coming within the scope of said invention, will be readily appreciated.

While I have illustrated and described a particular form in which my invention can readily be carried out, I do not wish to be limited to the form illustrated, for it will be obvious that it is capable of embodiment in many other forms. In fact, it can be applied to many kinds of reciprocating mechanisms—as, for instance, sieves for screening purposes and the like.

Having thus described my invention, I claim as new and desire to secure by Letters Patent—

1. A thill-coupling comprising means for receiving a thill or the like, means for guiding the thill to move rectilinearly, and yielding means for resisting motion of the thill in both directions.

2. A thill-coupling, comprising a guide, a yoke adapted to be guided thereby and to receive a thill or the like, yielding means for resisting a forward pull on the thill, and yielding means for resisting a backward thrust on the thill.

3. A thill-coupling, comprising a frame adapted to be attached to the axle or frame of a vehicle, guides connected with said frame, a yoke adapted to be connected with the thills or tongue of the vehicle and provided with means by which its motion is controlled by said guides, and means for resisting motion of the yoke in both directions.

4. The combination of a frame adapted to be secured to a portion of a vehicle and having guides thereon, a yoke movably mounted with respect to said frame, a pin connected with said yoke and provided with means for engaging said guides, said yoke being provided with feet, a rod passing freely through each of said feet, means connected with the rods for preventing their motion past the feet in one direction, and yielding means for resisting motion of the rods in either direction with respect to the frame.

5. The combination of a movable yoke having feet provided with perforations, a plurality of rods one mounted to move in each of said perforations, a nut upon each of said rods adapted to engage said feet, a disk provided with perforations for receiving said rods and mounted adjacent to said feet, a second disk similarly formed and spaced from the first disk, and a spring located between said disks.

6. The combination of a movable yoke having feet provided with perforations, a plurality of rods one mounted to move in each of said perforations, a nut upon each of said rods adapted to engage said feet, a disk provided with perforations for receiving said rods and mounted adjacent to said feet, a second disk similarly formed and spaced from the first disk, a spring located between said disks, a stationary frame on the outside of one of said disks, a plate on the outside of the other disk and connected with said frame, and means for preventing the rods from moving beyond said plate in one direction.

7. The combination of a movable yoke having feet provided with perforations, a plurality of rods one mounted to move in each of said perforations, a nut upon each of said rods adapted to engage said feet, a disk provided with perforations for receiving said rods and mounted adjacent to said feet, a second disk similarly formed and spaced from the first disk, a spring located between said disks, a stationary frame on the outside of one of said disks, a plate on the outside of the other disk and connected with said frame, means for preventing the rods from moving beyond said plate in one direction, means on the frame for guiding said disks in a straight line, and a projection on the frame for guiding the yoke in a line parallel to that in which the disks are guided.

8. The combination of a frame adapted to be secured to a portion of a vehicle and having guides thereon, a yoke movably mounted with respect to said frame, a pin connected with said yoke and provided with means for engaging said guides, and yielding means for resisting motion of the yoke in both directions with respect to the frame.

9. The combination of a frame adapted to be secured to a portion of a vehicle, a yoke movably mounted with respect to said frame, a rod passing freely through said yoke, means connected with the rod for preventing its motion past the yoke in one direction, and yielding means for resisting motion of the yoke in both directions with respect to the frame.

10. The combination of a movable yoke provided with perforations, a plurality of rods one mounted to move in each of said perforations, a nut upon each of said rods adapted to engage said yoke, a disk provided with perforations for receiving said rods and mounted adjacent to said yoke, a second disk spaced from the first disk, a spring located between said disks, a frame on one of said disks, a plate on the other disk and connected with the frame, and means for preventing the rods from moving beyond said plate in one direction.

In testimony whereof I have signed my name to this specification in the presence of two subscribing witnesses.

CARLOS VIVES-NAVARRO.

Witnesses:
W. J. VIDAL,
JOSÉ CUEVAS.